United States Patent [19]
Nakamura

[11] Patent Number: 6,094,070
[45] Date of Patent: Jul. 25, 2000

[54] INTERFACE CIRCUIT

[75] Inventor: Kazuyuki Nakamura, Tokyo, Japan

[73] Assignee: NEC Corporation, Tokyo, Japan

[21] Appl. No.: 09/095,020

[22] Filed: Jun. 10, 1998

[30] Foreign Application Priority Data

Jun. 10, 1997 [JP] Japan ................................ 9-152443

[51] Int. Cl.⁷ .................. H03K 19/0175; H03K 19/003
[52] U.S. Cl. .................. 326/86; 326/27; 326/30
[58] Field of Search ................ 326/83, 86, 26, 326/27, 30

[56] References Cited

U.S. PATENT DOCUMENTS

| | | | |
|---|---|---|---|
| 5,362,996 | 11/1994 | Yizraeli | 326/27 |
| 5,463,326 | 10/1995 | Raje | 326/30 |
| 5,559,447 | 9/1996 | Rees | 326/30 |

FOREIGN PATENT DOCUMENTS

| | | |
|---|---|---|
| 4-29407 | 1/1992 | Japan . |
| 7-142985 | 6/1995 | Japan . |

*Primary Examiner*—Michael Tokar
*Assistant Examiner*—James H. Cho
*Attorney, Agent, or Firm*—Foley & Lardner

[57] ABSTRACT

An interface circuit includes first transistors for driving bus lines through which data is transmitted between a plurality of semiconductor elements. The interface circuit controls the data transmitted through the bus lines when the first transistors are in the ON state. The interface circuit also includes second transistors which share a ground line with the first transistors and in which currents equivalent to currents flowing in the first transistors flow in the ON state. The second transistors are set in the ON state when the first transistors are set in the OFF state, and vice versa.

8 Claims, 3 Drawing Sheets

INTERFACE CIRCUIT

BACKGROUND OF THE INVENTION

1. Field of the Invention

The present invention relates to an interface circuit provided between LSIs.

2. Description of the Prior Art

FIG. 1 shows an example of the arrangement of a conventional open drain type interface circuit.

As shown in FIG. 1, in a conventional open drain type interface circuit, when 3-bit data is to be exchanged between chips A and B, first transistors MN0 to MN2 are arranged for three bus lines B0 to B2, respectively, to drive them. The current flowing in an inductance component L between an internal ground line and an external ground line changes depending on the codes exchanged between the chips A and B. This produces an internal ground potential bounce, resulting in a decrease in noise margin at the interface level.

For example, in the circuit shown in FIG. 1, if the current flowing in each of the bus lines B0 to B2 is represented by I, the current flowing in the inductance component L changes from 0 to 3I in accordance with the codes exchanged between the chips A and B.

More specifically, when all signals x0 to x2 input to the gates of the first transistors MN0 to MN2 are at low level ("0"), all the transistors MN0 to MN2 are set in the OFF state. As a result, a current flowing in the inductance component L is zero. When all the signals x0 to x2 input to the gates of the first transistors MN0 to MN2 are at high level ("1"), all the first transistors MN0 to MN2 are set in the ON state. As a result, a current of 3I flows in the inductance component L.

When, therefore, all the bits of the code exchanged between the chips A and B are inverted, i.e., changed from "000" to "111" or "111" to "000", the current flowing in the inductance component L changes from 0 to 3I or 3I to 0 in a short period of time. As a result, an induced voltage (noise: ground bounce) is produced on the internal ground line owing to a parasitic inductance component.

As a method of solving the above problem, a method of transmitting a 1-bit signal through two differential signal lines is available.

In addition, a low weight coding method has recently been proposed (1996 IEEE Symposium on VLSI Circuit, proceedings: pp. 144–145). In this method, the ratio of "1"s (high level) contained in a binary signal exchanged between LSI interfaces or the ratio of transition of the signal between "0" and "1" is operated by adding a redundant bit, thereby reducing noise or power. Noise can be reduced in half by limiting the number of "1"s contained in an output code to ½ or less using this low weight coding method.

In the above conventional interface circuits, the following problems are posed.

(1) In the circuit designed to transmit a 1-bit signal through two differential signal lines, the numbers of signal lines and pins between LSIs increase twice, resulting in an increase in package cost.

(2) In the low weight coding method, changes in current flowing in the inductance component cannot be completely eliminated. To do this, more redundant bits and a more complicated coding circuit are required.

SUMMARY OF THE INVENTION

The present invention has been made in consideration of the above problems in the prior art, and has as its object to provide an interface circuit which can reduce noise without increasing the cost and using any complicated circuit.

In order to achieve the above object, according to the first aspect of the present invention, there is provided an interface circuit including a first transistor for driving a bus line through which data is transmitted between a plurality of semiconductor elements, the interface circuit being adapted to control the data transmitted through the bus line when the first transistor is in an ON state, comprising a second transistor which shares a ground line with the first transistor and in which a current equivalent to a current flowing in the first transistor flows in an ON state, p1 wherein the second transistor is set in an ON state when the first transistor is set in an OFF state, and is set in an OFF state when the first transistor is in an ON state.

According to the second aspect of the present invention, there is provided an interface circuit including a plurality of first transistors for driving a plurality of bus lines through which data is transmitted between a plurality of semiconductor elements, the interface circuit being adapted to control the numbers of high- and low-level bits contained in the data by adding a redundance bit to the data transmitted through the bus lines and to control the data transmitted through the bus lines when the first transistors are in an ON state, comprising a plurality of second transistors which share a ground line with the first transistors and in which a current equivalent to a current flowing in the first transistors flows in an ON state, wherein a sum of currents flowing in the first and second transistors in an ON state is controlled to be always constant. in the first aspect, the number of second transistors are equal to that of first transistors.

In the second aspect, the number of second transistors are those required to make a sum of currents flowing in said first and second transistors constant.

In the present invention having the above aspects, the number of second transistors, which share the ground line with the first transistors and in which currents equivalent to the currents flowing in the first transistors flow in the ON state, is set to equal to the number of bits of data to be transmitted. The inverted signals of signals for driving the first transistors are input as driving signals to the second transistors to drive them.

With this arrangement, the current flowing in the output transistor ground line is always kept to a predetermined current value. This prevents the current flowing in the parasitic inductance component from changing even when the data transmitted between the semiconductor elements changes.

In the interface circuit for controlling the numbers of high- and low-level bits contained in the data by adding a redundance bit to the data transmitted through the bus lines and controlling the data transmitted through the bus lines when the first transistors are in an ON state, if second transistors which share a ground line with the first transistors and in which currents equivalent to currents flowing in the first transistors flow in the ON state are provided, and the sum of currents flowing in the first and second transistors in the ON state is controlled to be always constant, the value of the current flowing in the ground line can be limited to ½ the number of bits. This prevents an increase in power.

The above and many other objects, features and advantages of the present invention will become manifest to those skilled in the art upon making referent to the following detailed description and accompanying drawings in which preferred embodiments incorporating the principles of the present invention are shown by way of illustrative examples.

DETAILED DESCRIPTION OF PREFERRED EMBODIMENTS

A few preferred embodiments of the present invention will be described in detail with reference to the accompanying drawings.

Figure 2:
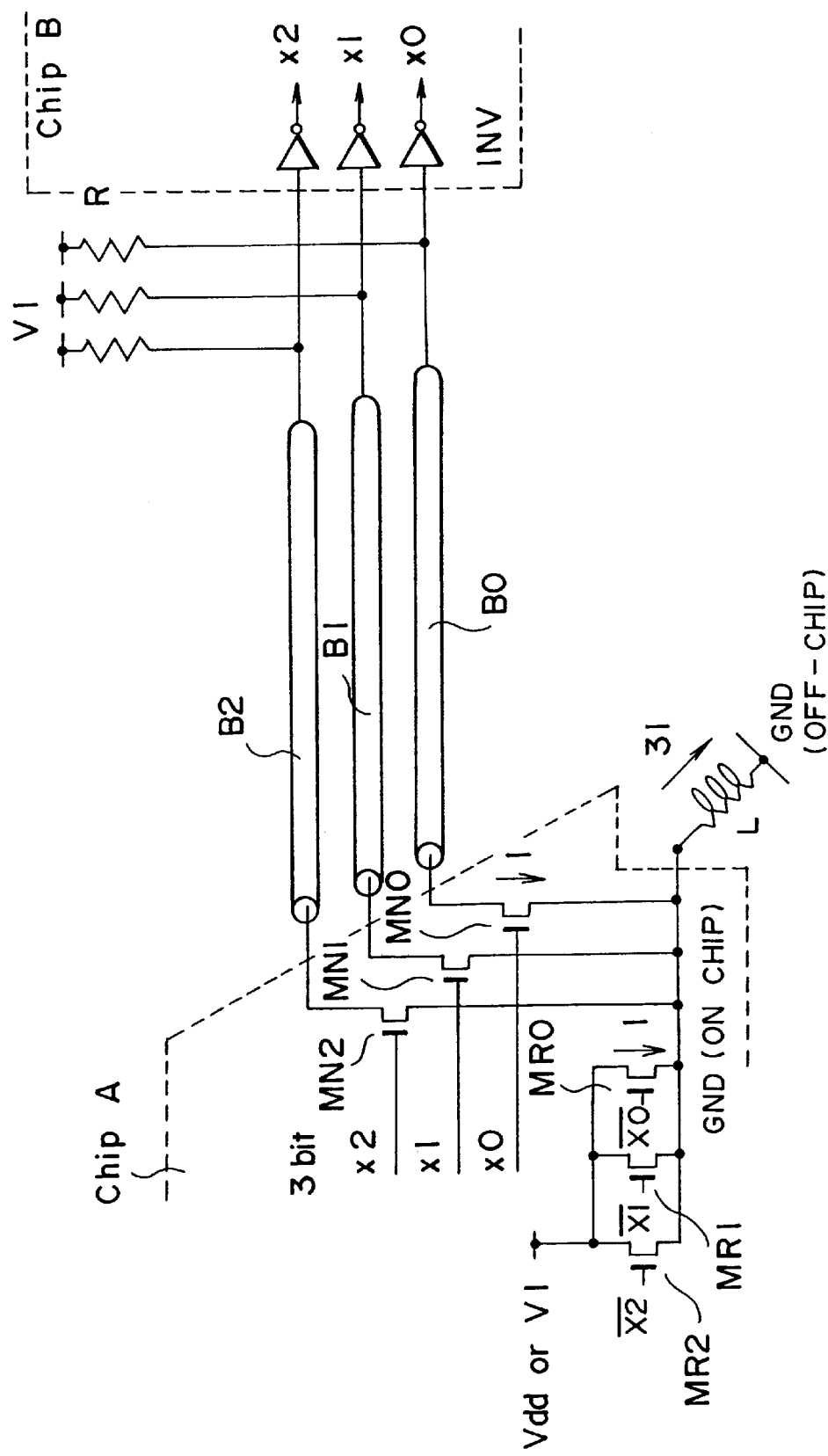
FIG. 2 is a circuit diagram showing the arrangement of an interface circuit according to an embodiment of the present invention.

FIG. 2 shows an interface circuit according to an embodiment of the present invention.

Figure 1:
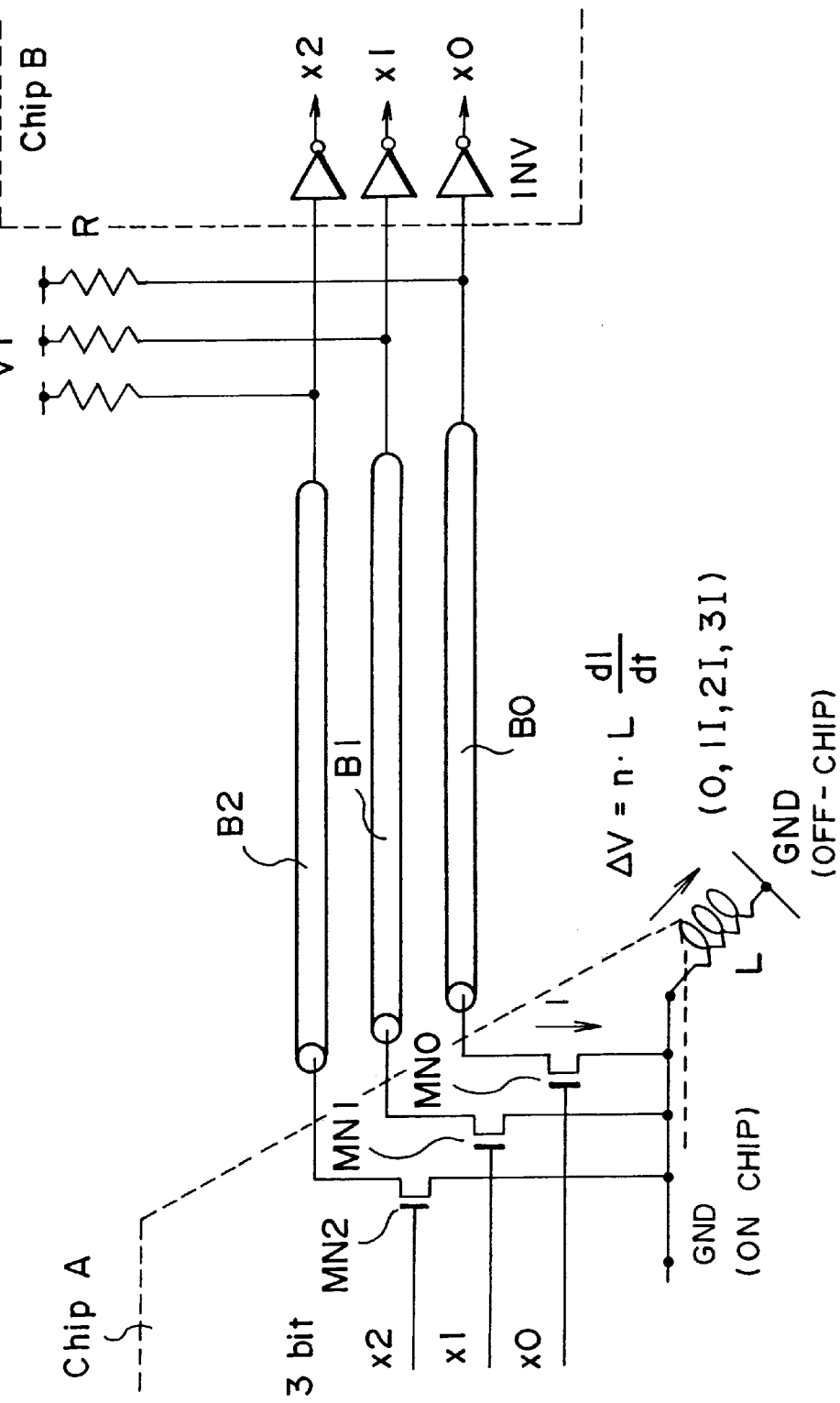
FIG. 1 is a circuit diagram showing an example of the arrangement of a conventional open drain type interface circuit.

In contrast to the circuit shown in FIG. 1, the circuit of this embodiment has a parallel circuit of output current replica transistors MR0 to MR2 as second transistors that share a ground line with transistors MN0 to MN2 and are ON/OFF-operated in accordance with the inverted signal of a code exchanged between chips A and B. The output current from this parallel circuit flows in an inductance component L. Inverted signals of signals x0 to x2 input to the gates of the first transistors MN0 to MN2 are respectively input to the gates of the output current replica transistors MR0 to MR2. Currents equivalent to the currents flowing in bus lines B0 to B2 respectively flow in the output current replica transistors MR0 to MR2.

In the interface circuit having the above arrangement, since the inverted signals of the signals x0 to x2 input to the gates of the first transistors MN0 to MN2 are respectively input to the gates of the output current replica transistors MRO to MR2, one of the transistor MN0 and the output current replica transistor MR0 is always in the ON state, while the other transistor is in the OFF state. Similarly, one of the transistor MN1 and the output current replica transistor MR1 is always in the ON state, while the other transistor is in the OFF state. One of the transistor MN2 and the output current replica transistor MR2 is always in the ON state, while the other transistor is in the OFF state.

For this reason, in this embodiment, if the current flowing in each of the bus lines B0 to B2 is represented by I, a current of 3I always flows in an inductance component L between the on-chip ground line and the off-chip ground line regardless of the code exchanged between the chips A and B. This reduces the ground bounce due to the parasitic inductance component produced when a current change occurs in switching operation.

In the above interface circuit, however, since currents corresponding to the number of bits always flow, the amount of current consumed by I/O operation increases. If, therefore, an output code is random, the current consumption increases about twice.

Figure 3:
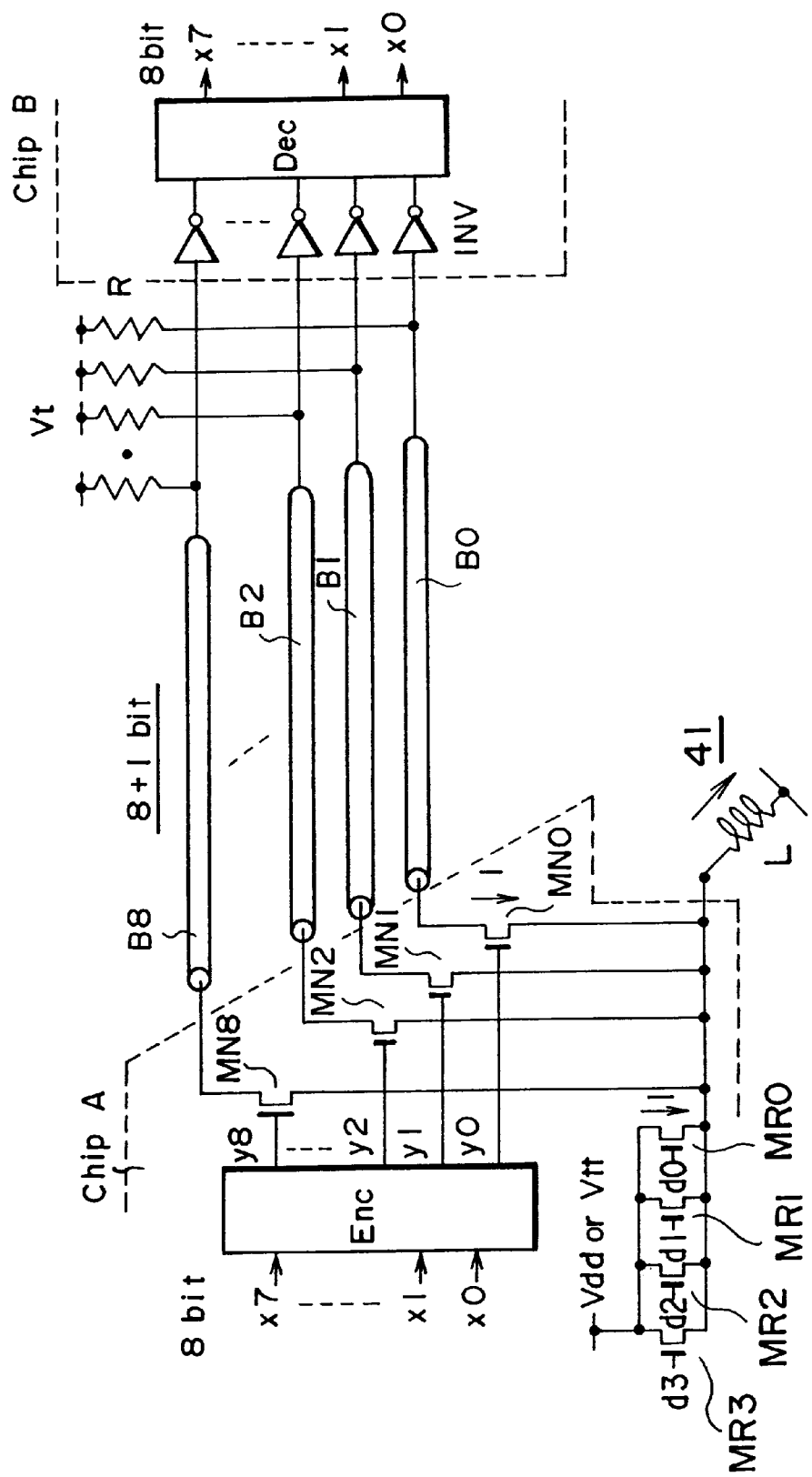
FIG. 3 is a circuit diagram showing the arrangement of an interface circuit according to another embodiment of the present invention.

FIG. 3 is a circuit diagram showing an interface circuit according to another embodiment of the present invention, in which 8-bit data is to be exchanged.

In contrast to the circuit shown in FIG. 2, as shown in FIG. 3, in this embodiment, one bit is added as a redundant bit to an output code. With this operation, a low weight code in which the number of "1"s contained in the code is ½ or less the bit width is used.

By adding the redundant bit, the number of "1"s contained in the code is limited to ½ or less the bit width. For this reason, the number of transistors that are turned on in response to 8-bit data is always four or less.

Four output current replica transistors MR0 to MR3 are therefore sufficient for this circuit. If the current flowing in an inductance component L is smaller than 4I, a shortage of current may be supplied from the output current replica transistors MR0 to MR3. In this case, a current of 4I always flows in the inductance component L. That is, the current can be reduced to ½ the current in the circuit in FIG. 2, which is 8I.

What is claimed is:

1. An interface circuit comprising:
   a first transistor for driving a bus line through which data is transmitted between a plurality of semiconductor elements, said interface circuit being adapted to control the data transmitted through said bus line when said first transistor is in an ON state; and
   a second transistor which shares a ground line with said first transistor and in which a current equivalent to a current flowing in said first transistor flows in an ON state,
   wherein when said second transistor is in an ON state, said first transistor is always in an OFF state, and when said first transistor is in an ON state, said second transistor is always in an OFF state.

2. A circuit according to claim 1, further comprising:
   a third transistor for driving another bus line through which data is transmitted between the plurality of semiconductor elements; and
   a fourth transistor which shares a ground line with said third transistor and in which a current equivalent to a current flowing in said third transistor flows in an ON state,
   wherein, when said fourth transistor is in an ON state, said third transistor is always in an OFF state, and when said third transistor is in an ON state, said fourth transistor is always in an OFF state.

3. A circuit according to claim 2, wherein a gate input to the first transistor is complementary to a gate input to the second transistor, and a gate input to the third transistor is complementary to a gate input to the fourth transistor.

4. A circuit according to claim 1, wherein a gate input to the first transistor is complementary to a gate input to the second transistor.

5. An interface circuit comprising:
   a plurality of first transistors for driving a plurality of bus lines through which data is transmitted between a plurality of semiconductor elements, said interface circuit being adapted to control the numbers of high- and low-level bits contained in the data by adding a redundance bit to the data transmitted through said bus lines and to control the data transmitted through said bus lines when said first transistors are in an ON state; and
   a plurality of second transistors which share a ground line with said first transistors and in which a current equivalent to a current flowing in said first transistors flows in an ON state,
   wherein a sum of currents flowing in said first and second transistors in an ON state is controlled to be constant.

6. A circuit according to claim 3, wherein the number of said second transistors are selected to make a sum of currents flowing in said first and second transistors constant.

7. In an interface circuit having a first transistor for controlling a data line and a second transistor which shares an internal ground line with the first transistor, a method of controlling a current flowing between the internal ground line and an external ground line, said method comprising the steps of:

supplying complementary control signals to the first and second transistors so that the first transistor is always in an OFF state when the second transistor is in an ON state and the second transistor is always in an OFF state when the first transistor is in an ON state.

8. A method according to claim 7, wherein the current flowing through the first transistor when in an ON state is equal to the current flowing through the second transistor when in an ON state.

* * * * *